UNITED STATES PATENT OFFICE 2,595,494

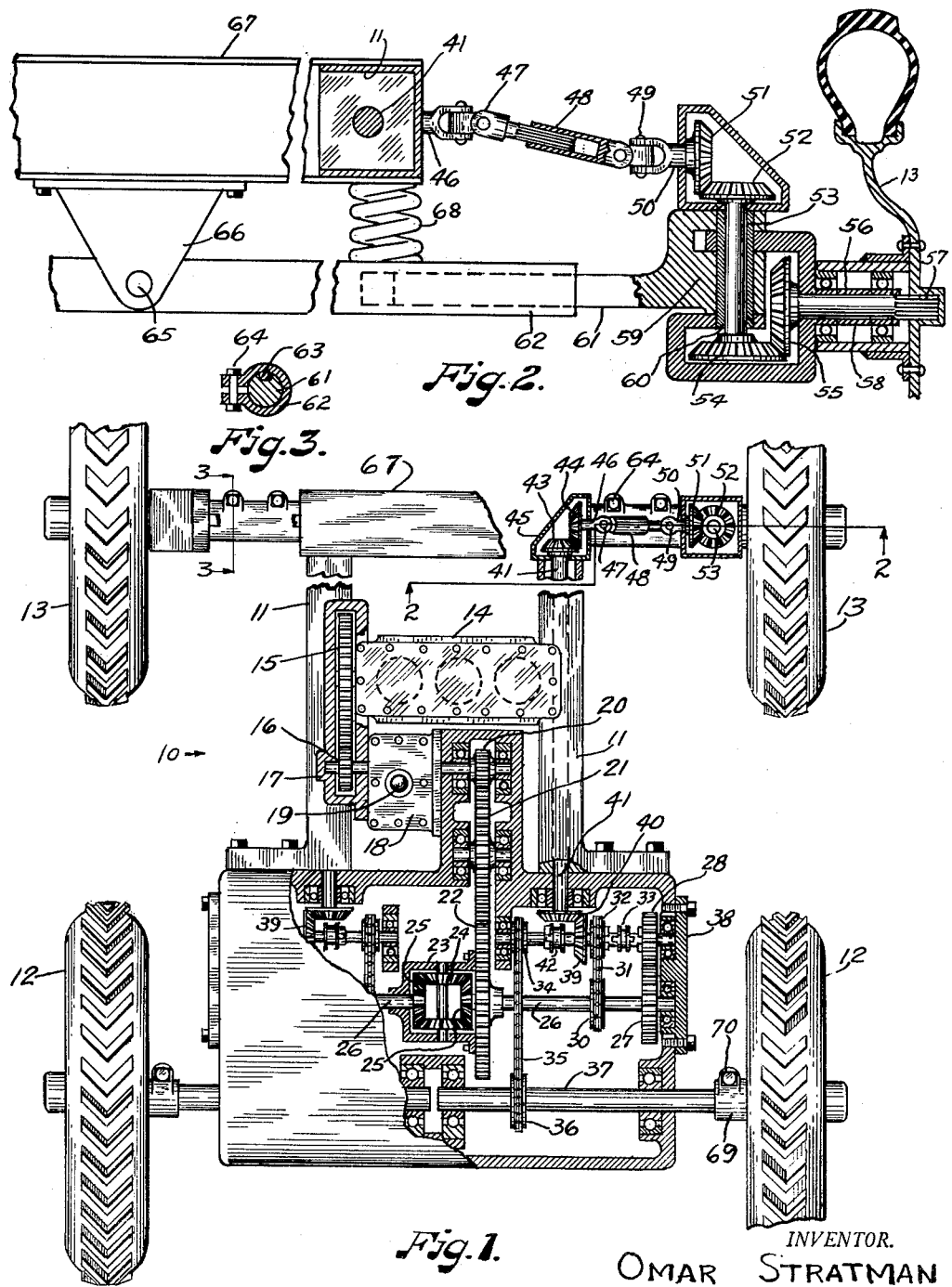

FOUR-WHEEL DRIVE TRACTOR

Omar Stratman, Gunnison, Colo.

Application September 7, 1948, Serial No. 47,958

2 Claims. (Cl. 180—49)

This invention relates to tractors and more particularly to improvements in four-wheel drive transmissions.

One of the objects of the invention is to provide a simplified four-wheel drive system for tractors which utilizes a single differential gear for all wheels.

Another object is to provide a transmission which will effect selective speeds of the tractor in reverse, as well as forward.

Another object is to provide a transmission in which the speed ratio between engine and wheels may be readily changed.

These and other objects will become more apparent from a consideration of the description to follow, the appended claims and the accompanying drawing in which:

Figure 1 is a plan view of the tractor, certain parts thereof being broken away and others shown in section;

Figure 2 is a section taken on line 2—2, Figure 1; and

Figure 3 is a section taken on line 3—3, Figure 1.

Referring in detail to the drawing, there is shown in Figure 1 a tractor 10, having a frame 11, to the rear end of which is attached a pair of wheels 12, and to the front a pair of steerable wheels 13.

An engine 14 is mounted on the frame with its crankshaft axis transverse to the longitudinal axis of frame 11. A gear 15 is fixed to the engine crankshaft and meshes with a gear 16, these gears being enclosed in a suitable gear housing 17. Gear 17 is connected to one end of a selective speed transmission 18 of conventional type, such as used in automobiles or tractors, and may have three or four forward speeds, and a reverse gear, if desired. Since the particular details of the selective speed transmission form no part of the invention and are well known in the art, detailed illustration thereof is omitted in the interests of clarity. The usual shift lever 19 is provided on transmission 18.

The power output shaft of transmission 18 has fixed thereto a gear 20 which meshes with an idler gear 21, the latter meshing with a gear 22, all of these gears being supported by suitable bearings such as the ball bearings shown. While this portion of the power transmission has been illustrated as a gear train, it is to be understood that sprockets and a chain or other power transmission devices could be employed, if so desired.

Gear 22 is the counterpart of the usual differential ring gear used in automobiles and tractors and is fixed to a differential housing 23, which pivotally supports therein bevel spider gears 24, which mesh with bevel gears 25 affixed to ends of shafts 26. The details of the drive mechanism between the differential and the respective pairs of front and rear wheels on each side of the tractor are identical, hence, these details have been illustrated for one side only and will be described accordingly.

Shaft 26 has affixed thereto near its end a gear 27 which meshes with a gear 28, the latter being rotatably mounted on a counter or jack shaft 29. Shaft 26 also has affixed thereto a sprocket 30 which is connected by a chain 31 to a sprocket 32, also rotatably mounted on shaft 29. A dog clutch 33 is slidably mounted upon shaft 29 by splines or the like and the end faces thereof are provided with the usual projections for engagement in slots in the faces of gear 28 and sprocket 32. This dog is also provided with a suitable groove for shifting it in either direction, shifting being achieved by the usual yoke and lever normally employed (not shown). The control between the dogs 33 on the respective shafts 29 may be interlocked so that the two dog clutches may be both in neutral, both in engagement with sprockets 32 or both in engagement with gears 28.

Shaft 29 has affixed thereto a sprocket 34 which is connected by a chain 35 to a sprocket 36 affixed to rear axle 37. It will now become apparent that the rear wheels 12 of the tractor may be rotated in either direction depending upon the position of dogs 33 and also that the rear wheels have interposed therebetween the usual differential gear to provide differential rotation of the rear wheels as the tractor follows a curved path. It is to be particularly observed, also, that since the multiple selective speed transmission is ahead, in the drive line, of reverse transmission 27, 28, 30, 31 and 32, etc., the tractor may be driven in either direction with the various speed ratios provided by transmission 18. The tractor thus has equal versatility regardless of the direction, whether forward or reverse, in which it may be operated.

Since tractors must operate under many varied conditions of terrain, drawbar pull and direction of travel, sprockets 30, 32, and gears 27, 28, are rendered readily accessible through a removable cover plate 38 so that these parts of the transmission may be interchanged with gears or sprockets which will provide various ratios between shafts 26 and axles 37. If, for example, it is desired to pull an implement which requires an excessive draw bar pull, these gears and/or sprockets are interchanged with others of suitable low ratio so that the tractor is capable of delivering the requisite draw bar pull. Similarly, if the draw bar pull is to be light, the ratio may be made higher so that the tractor will move faster for a given engine speed and power requirement thereon.

Each front wheel is driven in synchronism with its corresponding rear wheel by a transmission to now be described. Each shaft 29 rotatably carries thereon a bevel gear 39 which meshes with a bevel gear 40 affixed to a shaft 41 which extends forwardly of the tractor, this shaft being adjacent or within frame 11. A dog clutch 42, similar to dog clutch 33, is spline mounted on shaft 29 and when in engagement with bevel gear 39 provides a driving connection to a front wheel. It is apparent that the front wheel drive may be disconnected by clutches 42 when desired. The front end of shaft 41 has affixed thereto a bevel gear 43 which meshes with a bevel gear 44, these gears being enclosed in a suitable gear box 45. Bevel gear 44 is connected by shaft 46, universal joint 47, splined extensible connection 48, and universal joint 49, to a shaft 50 which has affixed thereto a bevel gear 51 which meshes with a similar gear 52. Gear 52 is affixed to shaft 53 which carries a bevel gear 54, the latter meshing with a bevel gear 55, mounted on the inner end of shaft 56. The outer end of shaft 56 is spline connected at 57 to the hub of wheel 13 which is rotatably mounted on spindle 58 which latter is pivoted to axle yoke 59 by tubular king pin 60.

The axle proper is formed of two parts 61, 62, which are telescopically connected together. A suitable key 63 is provided to prevent relative rotation between axle parts 61, 62, as shown in Figure 3. This form of connection is intended as illustrative only and it is apparent that other means for preventing rotation may be employed. Suitable clamp bolts 64 secure parts 61 and 62 in any relative position of adjustment. The inner end of axle part 62 is pivoted by a pin 65 to a bracket 66 secured to the underside of a cross frame member 67. A spring 68 is interposed between the axle and frame, to support the load of the tractor and absorb shocks. The two spindles 58 may be interconnected by any suitable steering mechanism (not shown) so that the front wheels properly follow along their steering arcs of curvature.

From the foregoing it now becomes apparent that the distance between the front wheels, normally referred to as the tread, may be adjusted so that they may follow between rows of crops and also that a driving connection thereto is provided for all positions of such adjustment and also all positions in which the wheels are turned on their spindles. The tread of the rear wheels may also be adjusted by sliding the rear wheel hubs 69 to the desired position on axles 37 and clamping same thereat by clamp bolts 70.

As previously mentioned, transmission 18 is connected to the engine by gears 15 and 16. While the gear ratio between the engine and transmission may be chosen as desired, under certain conditions it may be especially desirable to provide a speed up ratio, that is, one in which the gear 16 rotates faster than gear 15. Automobile transmissions, for example, are so designed to transmit their rated torque at sustained high speed, that is at speeds normally in excess of those employed in tractors. By choosing a relatively light duty transmission of this type and operating it at its high rated speed by the speed up ratio it may thus transmit the same power as a low speed heavy duty transmission which would otherwise be required. After the power is transmitted through the transmission at high angular speed and relatively low torque, the speed ratio between gears 20 and 22 is then reduced. Since the drive mechanism between transmission 18 and the wheels must be specially designed in any event, the reduction between gear 20 and 22 does not create any additional problems.

In summary, it will now become apparent that a tractor is provided in which the four wheels are driven in all possible positions which they may assume, including a variable tread, that the tractor may be driven either forwardly or rearwardly at selective speed ratios which ratios may be altered by interchangeable gears to suit the particular demands upon the tractor, that a single differential serves all four wheels, a light duty selective speed transmission may be employed, all of the foregoing being in a compact arrangement.

While the invention has been described in connection with a tractor, it will also become apparent that it is not necessarily limited thereto anad may also find application in automobiles or other vehicles.

It is further apparent that while a specific embodiment has been disclosed, many modifications may be resorted to without departing from the spirit or scope of the invention.

Having described the invention what is claimed as new is:

1. In an engine driven vehicle having a longitudinal frame supported at each end by a pair of wheels, the front pair being steerable, the combination therewith of a wheel drive mechanism comprising, an engine supported on the frame to the rear of the steerable wheels, the drive shaft of the engine extending transversely of the frame, a selective speed transmission mechanism supported on the frame to the rear of the engine, said mechanism having a power input shaft and a power output shaft projecting from opposite sides thereof, said shafts extending transversely of the frame, means comprising spur gears operatively connecting the drive shaft of the engine with the power input shaft of the transmission, a pair of jack shafts positioned to the rear of the transmission, one on each side of the longitudinal center line of the frame, mounted for rotation about axes extending transversely of the frame, a differential gear mechanism positioned to the rear of the jack shafts, arranged with its two shafts extending transversely of the frame, a gear mechanism transmitting rotary motion from the output shaft of the transmission to the bevel spider gear pinions of the differential, means for selectively turning each jack shaft in either direction by power derived from the corresponding differential shaft, a two part axle positioned to the rear of the differential, each shaft having at its outer end a wheel, means comprising a sprocket chain operatively interconnecting each jack shaft with the corresponding axle, and means for drivingly interconnecting each jack shaft with the corresponding steerable wheels the parts being so arranged that the four wheels turn in the same direction at the same time.

2. In an engine driven vehicle having a longitudinal frame supported at each end by a pair of wheels, the front pair being steerable, an engine supported on the frame the combination therewith of a selective multiple speed transmission positioned to the rear of the engine, said transmission having a power input and a power output shaft extending in opposite directions transversely of the frame, means drivingly connecting the power input shaft of said transmission to said engine, a differential positioned to the rear of the transmission having power output shafts extending in opposite directions transversely of the frame, means for transmitting rotation from the transmission output shaft to the bevel spider gear pinions of the differential, a pair of rotatable jack shafts positioned between the output shaft of the transmission and the differential shafts, said jack shafts being on opposite sides of the longitudinal center line of the frame and rotatable about axis that extend transversely of the frame, means selectively connecting each jack shaft to the corresponding differential power output shaft, said means comprising a gear connection and a sprocket and chain connection selectively engageable to rotate the jack shafts in either direction, a pair of rotatable axle shafts positioned to the rear of said opposite extending differential shafts and parallel with them, sprocket and chain means connecting each axle shaft to the corresponding jack shaft, means for transmitting rotation from the jack shafts to the corresponding steerable wheel, and means for selecting the direction of rotation of the jack shafts.

OMAR STRATMAN.

REFERENCES CITED

The following references are of record in the file of this patent:

UNITED STATES PATENTS

| Number | Name | Date |
| --- | --- | --- |
| 1,068,957 | Worth | July 29, 1913 |
| 1,108,367 | Holtermann | Aug. 25, 1914 |
| 1,118,528 | Bruce | Nov. 24, 1914 |
| 1,216,410 | Brown | Feb. 20, 1917 |
| 1,274,068 | Millington | July 30, 1918 |
| 1,355,826 | Fawver | Oct. 19, 1920 |
| 1,623,929 | Loyd | Apr. 5, 1927 |
| 1,828,841 | Kingsley | Oct. 27, 1931 |
| 2,061,719 | Street, Jr. | Nov. 24, 1936 |
| 2,103,624 | Lester | Dec. 28, 1937 |
| 2,162,103 | Middleton | June 13, 1939 |
| 2,339,960 | Stephen | Jan. 25, 1944 |
| 2,375,184 | Bernhard | May 8, 1945 |

FOREIGN PATENTS

| Number | Country | Date |
| --- | --- | --- |
| 86,668 | Switzerland | Sept. 16, 1920 |
| 142,530 | Great Britain | Apr. 26, 1920 |
| 480,593 | Great Britain | Feb. 21, 1938 |
| 658,212 | France | Jan. 22, 1929 |